Jan. 1, 1924
R. P. ANSTOCK
DRAWING APPARATUS
Filed Oct. 5, 1920
1,479,691
5 Sheets-Sheet 1
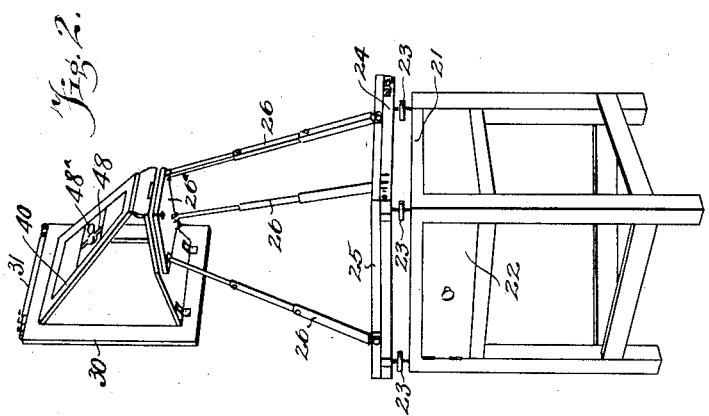
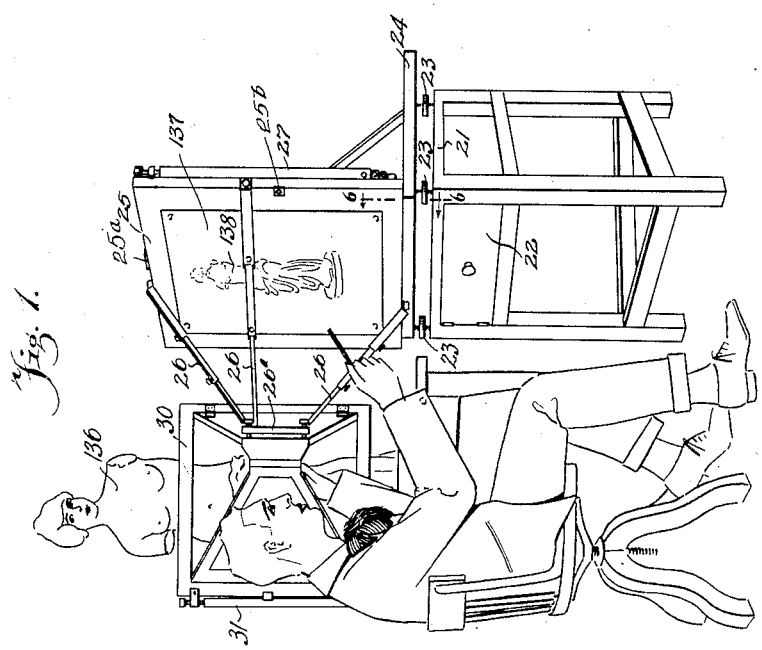
WITNESSES
INVENTOR
Roy P. Anstock
BY
ATTORNEYS

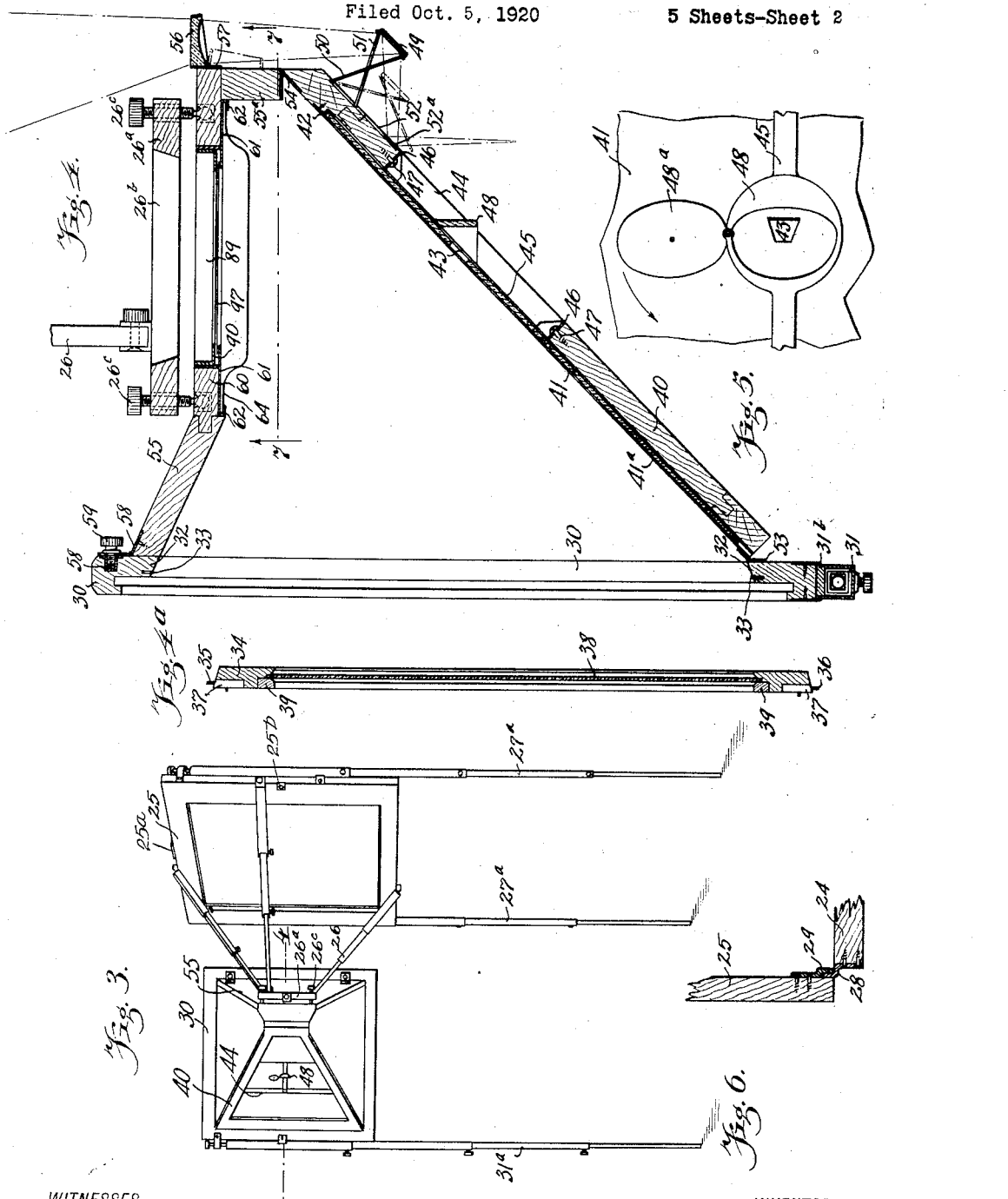

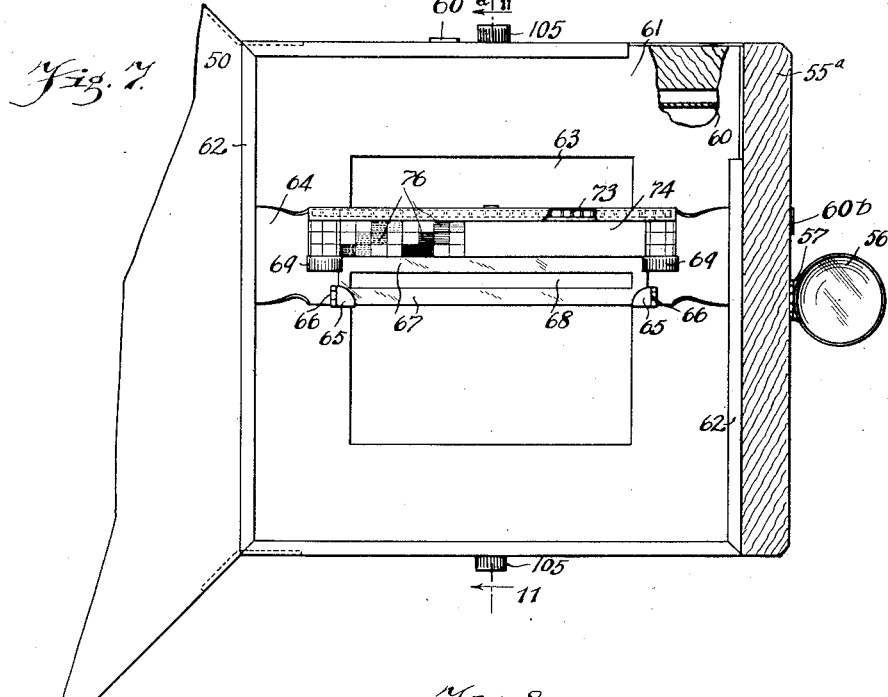

Jan. 1, 1924. 1,479,691
R. P. ANSTOCK
DRAWING APPARATUS
Filed Oct. 5, 1920 5 Sheets-Sheet 4
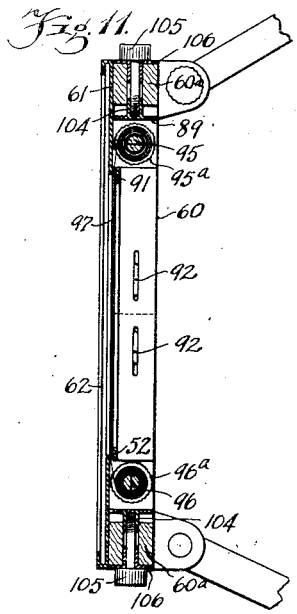
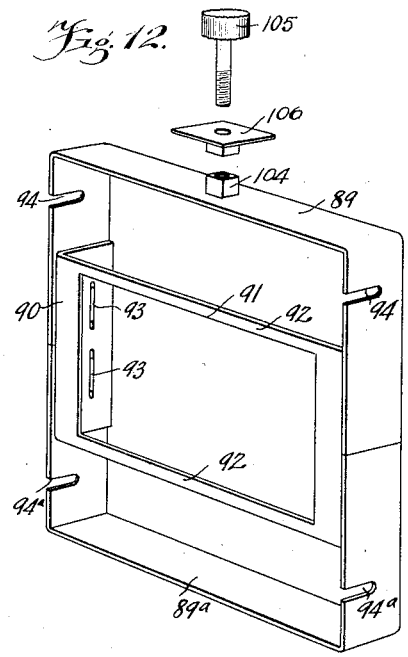
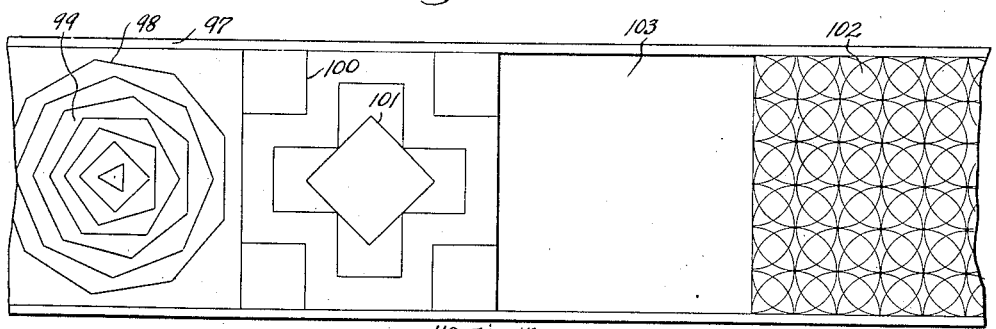
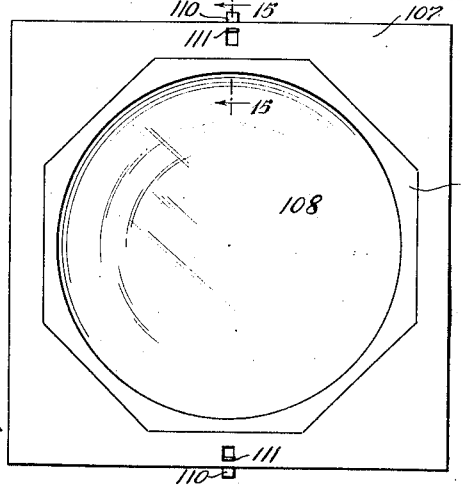
WITNESSES
INVENTOR
ROY P. ANSTOCK
BY
ATTORNEYS Jan. 1, 1924
R. P. ANSTOCK
DRAWING APPARATUS
Filed Oct. 5, 1920
1,479,691
5 Sheets-Sheet 5
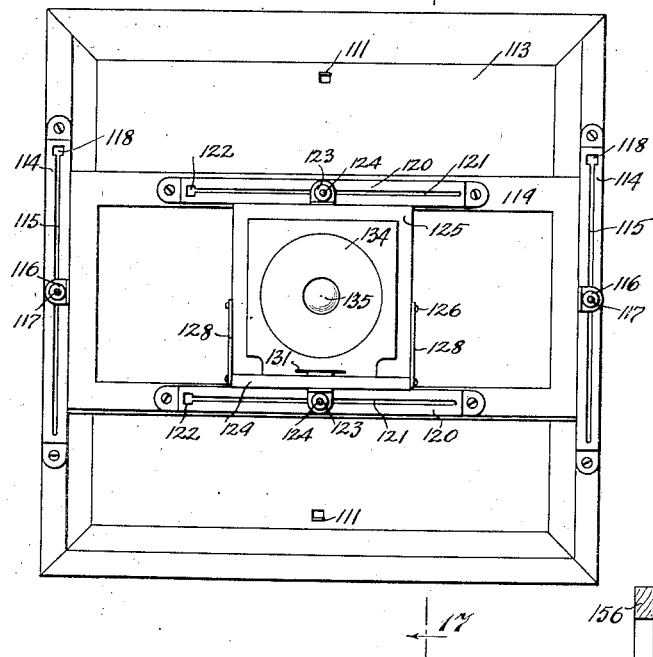
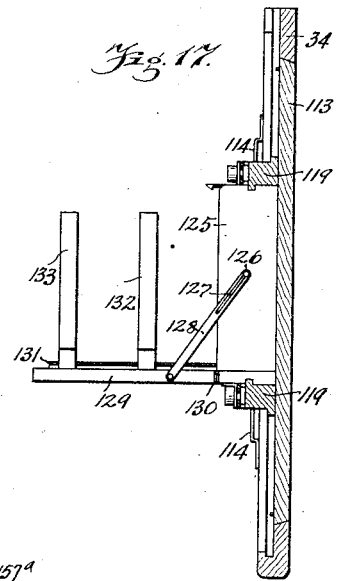
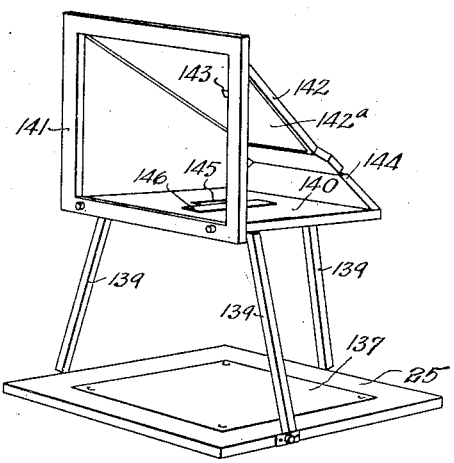
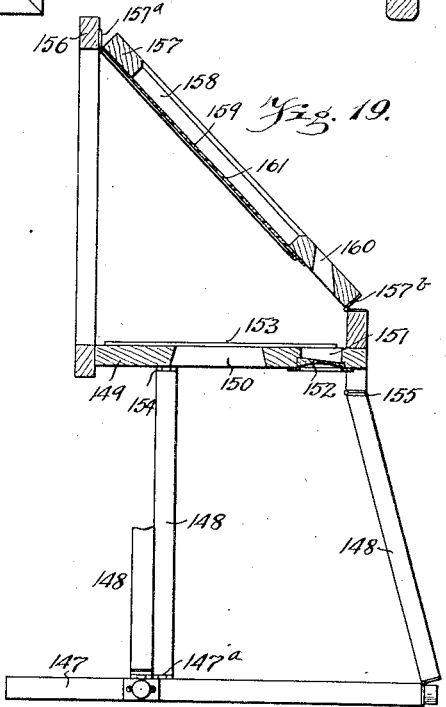
WITNESSES
INVENTOR
Roy P. Anstock
BY
ATTORNEYS Patented Jan. 1, 1924.

1,479,691

UNITED STATES PATENT OFFICE.

ROY P. ANSTOCK, OF MAHANOY CITY, PENNSYLVANIA.

DRAWING APPARATUS.

Application filed October 5, 1920. Serial No. 414,925.

*To all whom it may concern:*

Be it known that I, ROY P. ANSTOCK, a citizen of the United States, and resident of Mahanoy City, in the county of Schuylkill and State of Pennsylvania, have invented a new and Improved Drawing Apparatus, of which the following is a full, clear, and exact description.

My invention relates to drawing apparatus of the type in which the drawing is done by hand, but by aid of guides for enabling the operator to trace various outlines, and to reproduce colors selected by direct contrast or comparison.

More particularly stated, I seek to produce an apparatus to be used by artists, students, and amateurs for the purpose of enabling the operator to draw, paint or otherwise reproduce the representation of various objects, landscapes and marine scenes.

My invention further contemplates various mechanical improvements whereby the operator, considered as an artist, could derive considerable assistance in delineating various scenes, and placing the same upon appropriate surfaces, the work being done with great accuracy, and yet without any special skill or talent peculiar to the operator, and forming a part of his individuality.

Reference is made to the accompanying drawings, forming a part of this specification, and in which like reference characters indicate like parts through the several figures.

Figure 1 is a perspective, showing one form of my device, and one manner of using the same.

Figure 2 is a perspective of a form of my device differing slightly from that appearing in Figure 1, and used in a different way.

Figure 3 shows a portion of the mechanism appearing in Figure 1, but arranged in a different way, and ready for use in a manner different from that contemplated by the said Figure 1.

Figure 4 is a section on the line 4—4 of Figure 3 looking in the direction indicated by the arrows.

Figure 4ª is a section through a glass plate and frame therefor, to be detachably fitted into the mechanism shown in Figure 4.

Figure 5 is a fragmentary elevation of the eye-shield, and parts immediately associated therewith.

Figure 6 is a fragmentary section showing how certain parts of the mechanism shown in Figure 1 are detachably fitted together.

Figure 7 is a section on the line 7—7 of Figure 4 looking in the direction indicated by the arrows.

Figure 8 is a perspective of a slide, shown in Figure 7; but with certain parts broken away.

Figure 9 is a perspective of one of the spools appearing in Figure 7.

Figure 10 is a plan view of two specimen color charts used in connection with the mechanism appearing in Figure 7.

Figure 11 is a section on the line 11—11 of Figure 7 looking in the direction indicated by the arrows, the slide not being shown.

Figure 12 is a perspective of a part of the metallic framework shown in Figure 11.

Figure 13 is a fragmentary plan view of a chart provided with geometrical figures, and used with the apparatus shown in Figure 7.

Figure 14 is a plan view of a lens and lens holder, to be used in connection with the mechanism shown in Figure 4 for the purpose of defining and reducing the field of vision.

Figure 15 is a section on the line 15—15 of Figure 14 looking in the direction indicated by the arrows.

Figure 16 is an elevation of an auxiliary device, comprising lenses, and adjustments therefor, to be selectively employed, as required, for purposes of definition and reduction, the device being employed in connection with the parts shown in Figure 4.

Figure 17 is a section on the line 17—17 of Figure 16 looking in the direction indicated by the arrows.

Figure 18 is a perspective showing still another form of my device, and indicating the manner in which said last mentioned form is used.

Figure 19 is a substantially central, vertical section through still another form of my apparatus, and indicates the manner of use thereof, and Figure 20 is a perspective of a plate used as a part of the mechanism, shown in Figure 19.

In Figure 1, I show a three legged table 21, provided with a drawer 22 in which various loose parts can be conveniently housed. Fitted upon this table are leveling screws 23, and resting upon the latter is a base board 24.

A drawing board 25 rests upon its edge and is provided with a level $25^a$ in the center of the top, and a level $25^b$ in the center of the right hand side. The drawing board is provided with telescopic legs 27, which may be extended as shown in Figure 3 at $27^a$.

As a convenient means for supporting the drawing board 25 upon the base board 24, I provide the drawing board with lugs 29 secured rigidly to it adjacent its lower edge, as indicated in Figure 6, and I provide the base board 24 with lugs 28, and mating lugs 29. By this arrangement, the drawing board 25 can be quickly and easily disconnected from the base board 24. The telescopic legs 27 can be shortened in the conventional manner, and folded flat against the drawing board 25 as indicated in Figure 1.

A frame 30, has the general form of a truncated pyramid, and may be conveniently designated as a box. It carries a telescopic leg 31, as shown in the upper portion of Figure 2. This leg can be extended, or not, as required, according to the particular manner chosen, for using the frame 30 upon any particular occasion.

In Figure 3, the telescopic leg is shown as extended at $31^a$. The telescopic leg 31 is connected with the frame 30 by means of a sliding connection $31^b$, as shown more particularly at the bottom of Figure 4.

The frame 30 is open, as may be understood from Figure 4, and is provided internally with beveled edges 32, and with bolt holes 33. A frame part 34 is so formed as to neatly fit against the beveled edges 32, and is provided with sliding bolts 35—36 for extending into the bolt holes 33 in order to hold the frame 34 detachable within the frame 30.

The bolts 35—36 are slidably mounted in casings 37, and are adapted to be actuated by hand. The frame 34 carries a plain glass pane 38, the latter being held in position by a fastening 39.

A frame 40, has the general proximate form of a truncated triangle, and carries a mirror 41, having a backing $41^a$ of silvering or even of cloth, preferably green, in color. The mirror is sunken into the frame 40, and held in position relative thereto by fastenings 42. The mirror is provided with a small opening 43, which I designate as a peep hole. The frame 40 is cut away at 44, and carries a member 45, the latter being provided with upturned ends 46, secured to the frame 40 by fasteners 47. The member 45 has a peep opening registering with the peep opening 43 and has a shield 48 of the form shown more particularly in Figures 4 and 5. The peep opening of said member is provided with a mirror shutter $48^a$, which covers the peep opening, when the apparatus is not in use. A small mirror is shown at 49 in Figure 4 and is journaled to a plate 50, the latter being journaled to the frame 40 as indicated at the right of Figure 4. Another plate 51 is journaled to the mirror 49 and rests in a shallow compartment 52. The operator by sliding the plate 51 to different positions in the compartment 52 can adjust the mirror 49 to different angles, as required. The mirror 49 and parts immediately adjacent thereto may be folded as indicated by dotted lines in Figure 4, and is thus arranged in convenient form for enabling the device to be handled without injury to the mirror. The frame 40 is connected with the frame 30 by a hinge 53, shown near the bottom of Figure 4. Similarly by means of a hinge 54, the frame 40 is connected with a portion $55^a$ of a wall 55. A lens 56 is mounted in position upon this portion $55^a$ of the wall by a hinge 57, and is thus adapted to be folded flat against the wall, as indicated by dotted lines in Figure 4. The wall 55 carries a hinge 58 and the latter is detachably secured to the frame 30 by a thumb screw 59 which engages a threaded bearing 58 as shown in the upper left hand corner of Figure 4. The wall 55 is provided with a panel 60, and this panel has a facing 61 of sheet metal, the outer edge of this facing being bent to form a flange 62 as indicated more particularly in Figure 11. The flange 62 serves as a guide for certain parts as hereinafter described. The panel 60 and the facing 61 are provided with a central opening 63 as shown more particularly in Figures 7 and 11. The panel 60 is provided with a level vial $60^a$ on the top, and with another level vial $60^b$ on one of its sides. Mounted upon the panel 60 is a slide 64 having the form indicated more particularly in Figures 7 and 8. This slide is made of sheet metal and carries two small clamps 65 mounted upon it by means of hinges 66, and is thus adapted to be turned or swung within reasonable limits. The slide 64 also carries a mirror 67 having the form of a strip and provided with a slot 68. This mirror is detachably held in position by the clamps 65, and consequently can be removed, renewed, or adjusted, as occasion may require. The slides 64 carry two spools 69, each having a form shown more particularly in Figure 9. Each spool 69 is provided with a barrel 70 provided with a slot 71. Mounted rigidly upon the barrel is a sprocket wheel 72. A sprocket chain 73 extends from one of the spools to the other as shown more particularly in Figure 7.

Mounted upon the spools 69, and movable thereby relatively to the mirror 67, is a color chart of the kind shown at 74, 75 in Figure 10. In the chart 74 the colors are indicated at 76, and in the chart 75 the colors appear at 77.

The slide 64 is provided with two tongues 78, 79 the latter having slots 80, 81. These two slots together with two other slots 82, 83 are formed for the purpose of supporting the spools 69 as above described. A sheet metal guard 84 is mounted upon the slide 64 and may be swung into different positions relatively thereto in order to facilitate the removal and replacement of the color charts and parts supporting the same. The tongues 78, 79 carry a pair of holders 85, 86 each having a general arcuate form and used for the purpose of holding the spools in position. The slide also carries two clamping wires 87, 88 to facilitate guiding the colored charts.

The colored chart may be made of any suitable material but I prefer to employ celluloid. With the colored chart in position, the operator by turning the spools 69 can shift the position of the chart so as to bring any desired color into a predetermined position relatively to the mirror 67 and slot 68.

Carried by the panel 60 and located within the opening thereof, are two metal strips 89, 89ª together constituting a substantially rectangular frame, as shown more particularly in Figure 12. The strips 89, 89ª are movable relative to each other and are engaged by a cross plate 90 provided with an opening 91, this opening being bound by two narrow strips 92 integral with the plate 90. The strips 89, 89ª are connected with the cross plate 90 by connections 93 which enable the strips 89, 89ª to be moved slightly from or toward each other, as permitted by the sliding connections 93. The strip 89 is provided with two slots 94 and the strip 89ª is similarly provided with two slots 94ª. Mounted in the slots 94, 94ª are rollers 95, 96 and engaging these rollers is a celluloid strip 97, the form shown more particularly in Figure 13. This celluloid strip is provided with various geometrical figures 98, 99, 100, 101, 102, and is also provided with an opening 103. The rollers 95, 96 are provided with milled wheels 95ª, 96ª controllable by hand, so that the operator by turning these milled wheels can shift the position of the celluloid strip 97. By doing this he then brings any one or more of the geometrical figures carried by the strip into a suitable position to be observed, or he can bring the opening 103 into proper position to enable him to see through this opening when looking through the peep hole 43, which may be understood from Figures 4 and 5. Each strip 89, 89ª carries a threaded bearing 104 and detachably engaging this bearing is a thumb screw 105 extending through a smooth bearing 106. The operator, by turning the thumb screw 105 can regulate the distance apart of the strips 89, 89ª, and by doing this can readily adjust these parts relatively to each other.

A lens carrier 107, of the form indicated in Figure 14, carries a lens 108 for the purpose of defining images and scenery. The lens 108 is herein positioned upon the lens carrier by the aid of a ring 109. The lens carrier 107 is provided with two sliding bolts 110 each controllable by a thumb piece 111 and engaged by a spring 112 as indicated more particularly in Figure 15. The sliding bolts 110 are mounted in casings 107ª as shown more particularly in Figure 15, these casings being analogous to the casings 37 appearing in Figure 4ª. The lens carrier 107 is analogous to the frame 34 shown in Figure 4ª and above described, and is similarly adapted to be detachably mounted within the frame 30 in the same manner that the frame 34 is connected therewith. Another lens carrier appears at 113 in Figures 16 and 17. It has the general form of a rectangular frame, and carries two metallic strips 114 secured upon its right and left edges. These strips are provided with slots 115 and these slots are provided with wide portions 118. The strips 114 with their slots 115 serve as slide ways, and engaging these strips are bearings 116 provided with pins 117, the pins extending through the slots. A slide 119 having the general form of a rectangular frame engages the strips 114 and is movable relatively to these strips in the general direction of the length thereof. The slide 119 carries two strips 120, each provided with a slot 121 having at one end a comparatively wide portion 122, these strips serving as slide ways.

Engaging these strips are bearings 123 carrying pins 124 which extend through the slots 120. These bearings 123 are mounted upon a lens frame 125. This lens frame has the form of a box and is provided with guide pins 126 extending outwardly as indicated in Figure 17. These pins 126 extend through slots, one of which is shown at 127 in Figure 17. Two guide bars 128 are provided with these slots and are pivotally connected with a swing door 129 in such manner that this door may be brought into position indicated in Figure 17, or swung upwardly against the face of the lens frame 125. For this purpose the member 129 is connected with the lens frame by a hinge 130. The door 129 carries a tongue 131 and slidably fitted upon it are two lens carriers 132, 133. These lens carriers are severally provided with lenses 134, 135 as indicated more particularly in Figure 16. Each lens carrier 132, 133 is removable, and for this purpose can simply be slid off the tongue 131 by moving the lens carrier to the left according to Figure 17.

The purpose of this arrangement is to enable any particular lens 134, 135 to be chosen at the will of the operator, and to be brought into service when required by moving the slide 125 relatively to the slide 119 and by moving this slide relatively to the various stationary parts, the lens thus chosen can be brought into any desired position suitable to the convenience of the operator, and permitted by the limits of the mechanism shown in Figures 16 and 17.

The operation of the mechanism thus far described may be readily understood in view of the foregoing description. With the parts arranged as indicated in Figure 1, the operator takes his seat as shown and places his left eye adjacent the eye-piece so that his left eye can see through the peep hole 43 as may be understood from Fig. 4. His right eye is now in line with the mirror 52$^a$ and this mirror together with the mirror 49, enables him to see through the lens 56. Thus with his right eye he beholds a vignette of the picture he is drawing.

With his left eye he sees the drawing board 25 directly, as may be understood from Figure 1.

With his left eye he also sees the color chart shown in Figure 7 and looks directly at the mirror strip 67 as well as through the slot 68. Looking through the slot 68 he sees a relatively small portion of the drawing board. Looking into the mirror 67 he sees, reflected from the mirror 41, the scene or object, as the case may be, at his left.

In the particular instance indicated in Figure 1, a statue is shown at 136. This statue the artist sees fragmentarily within limits permitted by the size of the mirror 67, thus he can sketch upon paper 137, carried by the drawing board 25, an image 138 corresponding in outline to that of the statue.

The image thus reproduced may be made with pencil, or with color paint, or by aid of charcoal points, or in fact by any other means known to the artist for purposes of reproduction.

Suppose next, that the artist wishes to ascertain just what particular color is to be applied to the picture in order to simulate color in the actual scene. He finds upon the color chart the particular color which coincides with the color of the part of the scene upon which he is working, and having selected this color, he applies the paint or other coloring matter accordingly, so as to reproduce it.

For this purpose he shifts the color chart to the right or left, by the aid of the spools 69 or with either of them as above described.

If now the operator wishes to outline a geometric figure, either one in the actual scene before him or one which he chooses to supply with the aid of his imagination, he moves the geometrical chart 97 by means of the milled wheels 96, in the manner above described, until the proper portion of the chart is exposed to view, so that he can find the geometrical figure he requires. This done he simply uses the geometrical figure as a guide and follows it exactly or deviates from it to a greater or lesser extent as his judgment may require. He can look through the opening 103 of the chart 97, as may be understood from Figure 13, and by doing this he can view directly through this opening the surface of the drawing or painting upon which he is working. In this way, and by a proper adjustment of the various slides contemplated by Figs. 11 and 12, the artist can bring the geometrical figure into close proximity to the spot where he is at work upon the drawing or painting.

The artist may from time to time use the frame 34 as shown in Figure 4$^a$, the lens holder 107 occuring in Figure 14, or any of the lens carriers shown in Figures 16 or 17, as occasion may require.

When the operation is finished, the various parts may be folded relatively to each other so that the device as a whole would occupy a relatively small space. In using the apparatus shown in Figure 2, the operator looks downwardly through the peep hole 43, the drawing board 25 being horizontal as above described. Aside from this difference the action of the mechanism shown in Figure 2 is substantially the same as that above described with reference to Fig. 1.

In using the form of apparatus appearing in Fig. 3, the operator proceeds substantially as above described with reference to Figure 1.

In Figure 18 the mechanism is somewhat simpler than that contemplated in Figures 1, 2 and 3. The drawing board appears at 25 and mounted upon it is a sheet of canvas or drawing paper 137. Pivotally connected with the drawing board 25 are legs 139, which extend upwardly somewhat and support a board 140. A frame 141 is connected with this board and at 142 is a wall, inclined relatively to the board 140, and provided with a peep hole 143. The wall 142 is connected with a board 144 carried by the board 140. The board 140 is provided with an opening 145, and resting upon it is a mirror 146 corresponding to the mirror 67 above described. The operator looks through the peep hole 143 and opening 145 so as to see the surface of the paper or canvas 138. Mounted upon the underside of the board 142 is a mirror 142ª.

This device may be easily folded or otherwise packed away, and may be made and sold much more cheaply than in more elaborate forms as above described.

In the form shown in Figure 19 the board 147 serves the purpose of a base board and a drawing board as is the case with the base 137 shown in Figure 18. Connected with the board 147 by means of hinges 147ª are three legs 148, and supported upon these legs is a board 149 provided with two openings, 150, 151, the opening 151 being fitted with a lens 152 and a mirror 153 resting adjacent the opening 150. The board 149 is connected with the legs 148 by means of hinges 154, 155. An open frame 156 having a general rectangular form is mounted upon the board 149 and extends upwardly therefrom. Another board 157 is connected with the frame 156 by means of hinges, one of which appears at 157ª. The board 157 is also connected with a hinge 157ᵇ whereby the lower portion of this board is connected with the frame work. The board 157 is provided with an opening 158, and covering this opening is a mirror 159 provided with a peep hole 160.

The operator by looking downwardly brings one of his eyes opposite the peep hole 161 and his other eye into line with the openings 160, 151, and consequently into line with the surface of the drawing board 147 or of any paper or canvas resting thereupon.

In Figure 20 I show a plate 162 provided with a slot 163 and with a chart 164, this chart being either a geometrical chart or a colored chart, or both as desired. This plate 162 can be used in place of the plate 153 shown in Figure 19 if the operator so desires.

I do not limit myself to the precise mechanism shown, as variations may be made therefrom without departing from the spirit of the invention.

Having thus described my invention, I claim as new and desire to secure by Letters Patent:

1. A device of the character described, comprising a mirror provided with an opening through which an operator stationed at the rear of the mirror can see through the mirror, a second mirror, said second mirror being inclined relatively to the first mirror for enabling the operator to see through said opening the image of an object located in a direction at an angle to his line of vision, and a plurality of other mirrors for enabling the operator to see a vignette of the picture being drawn or painted.

2. A device of the character described comprising a frame work, a mirror mounted upon said framework and provided with means for enabling the operator standing at the rear of the mirror to see through the mirror, a second mirror located within the field of view of the operator thus looking through said peep hole, said second mirror being inclined relative to said first mentioned mirror, for enabling the operator, looking through the peep hole to view the image of a scene located in a direction out of the line of vision through the peep hole, and a plurality of other mirrors mounted upon said frame work and adjustable relatively thereto for enabling the operator to see an image of the scene, independently of the view thereof he may have through said peep hole.

3. A device of the character described, comprising a panel provided with an opening, a slide carried by said panel and movable bodily in reference thereto for purposes of adjusting the position of said slide relatively to said opening, a color chart carried by said slide, means controllable at the will of the operator for adjusting the position of the color slide relative to said opening, a mirror carried by said slide for reflecting the image of a scene, another mirror disposed at an angle and adjacent said first mentioned mirror and coacting therewith for reflecting an image of said scene on to a drawing board, said second mirror provided with a peep hole to enable the operator to view the image reflected on said drawing board.

4. A device of the character described comprising a panel provided with an opening, a slide mounted upon said panel and adjustable relative to said opening, a mirror carried by said slide and provided with a slot, a second mirror mounted independently of said panel and inclined relatively to said first mentioned mirror, said mirrors coacting together for reproducing a scene, said second mentioned mirror being provided with means for enabling the operator to look through said second mentioned mirror and see said first mentioned mirror.

5. A device of the character described comprising a rectangular frame provided with an opening, a lens carrier detachably mounted within said opening, a lens carried by said lens carrier, a mirror disposed adjacent said lens carrier and inclined relatively to the general plane thereof, said mirror being provided with an opening for enabling the operator to see through said mirror from the back side thereof, a second mirror disposed adjacent said first mentioned mirror and inclined relatively thereto, and means for supporting, at a point adjacent said second mentioned mirror, a surface upon which a picture is to be produced.

6. A device of the character described comprising a frame having the general form of a board and provided with an opening, a mirror carried by said frame and provided with a peep hole disposed adjacent said opening for the purpose of enabling the operator to see through said mirror from the back side thereof, a member mounted on said frame and having a peep opening registering with the peep opening of the mirror, and an eye shield carried by said member and disposed adjacent said peep hole.

7. A device of the character described comprising a mirror provided with a peep hole for enabling the operator to see through said mirror from the back side thereof, a second mirror disposed adjacent said first mentioned mirror and located within the field of vision of said peep hole for the purpose of enabling the operator by the use of a single eye to see through said peep hole and into said second mentioned mirror, means for supporting a surface upon which a picture is to be made, and means for enabling the operator by using the other eye, to see a scene which he is drawing and arranged at his side.

8. A device of the character described comprising a board serving the double purpose of a base board and a drawing board, legs connected with said board and extending upwardly therefrom, a second board mounted upon said legs and provided with a pair of openings, a lens mounted in one of said openings, and a third board located above said second mentioned board and defined relatively thereto, said third board being provided with a mirror facing obliquely downward and provided with a peep hole for enabling the operator to look downwardly therethrough, said third mentioned board being further provided with an opening in registry with the opening associated with said lens.

9. A device of the character described comprising a board serving as a drawing board and also as a base board, a second board supported over the first mentioned board and provided with an opening, a mirror disposed adjacent said opening, a third board inclined relatively to said second board and provided with an opening, and a mirror carried by said third board and provided with a peep hole located adjacent the opening in said third board.

10. A device of the character described, comprising a table, a base board mounted thereover, means controllable at the will of the operator for levelling said base board relatively to said table, a drawing board resting upon its edge and supported by said base board, means for reflecting an image upon said drawing board of an object not in the line of vision of an operator directly viewing the board, means for viewing the image on said drawing board, and means for viewing another image of the same scene.

11. In a device of the character described, comprising a table, a base board mounted upon said table, a drawing board mounted upon said base board and parallel thereto, means for adjusting said base board relatively to said table, telescopic legs mounted upon said drawing board, a frame carried upon said telescopic legs and supported thereby, means for viewing an image of an object not in the operator's direct line of vision, and means for viewing another image of the same object reflected on said drawing board.

12. In a device of the character described, a main frame, two mirror carrying frames hinged to the main frame and to each other to stand at an angle one to the other, a mirror in each frame, the mirror of one frame having a peep hole and the other a slot.

13. In a device of the character described, a main frame, a frame hinged to one side of the main frame and provided with a mirror having a peephole, and a second frame hinged to the first mirror frame and secured to the side of the main frame opposite that to which the first mirror frame is hinged, said second frame being provided with a mirror having a slot.

14. In a device of the character described, a main frame, two frames hinged to the main frame and to each other to stand at an angle one to the other, a mirror in one frame and having a peep hole, a slide mounted in the other frame, and a mirror detachably secured to the slide.

15. In a device of the character described, a main frame, two frames hinged to the main frame and to each other to stand at an angle to one another, a mirror carried by one frame, a lens carried by said frame and a plurality of mirrors carried by the other frame, one of the mirrors having a peep hole.

16. In a device of the character described, a main frame, two mirror carrying frames carried by the main frame and standing at an angle one to the other, a mirror in one frame and having a peep hole, a slide in the other frame, a mirror carried by the slide, and chart carrying spools mounted in the slide at one side of the mirrors and geared together.

17. In a device of the character described a main frame, two frames carried by the main frame and standing at an angle to each other, one of the frames being provided with an opening, a member mounted to slide in the said frame and extending across the opening thereof, a slotted mirror carried by the sliding member, and a mirror mounted in the other frame and provided with a peep hole.

18. In a device of the character described, a main frame, two frames carried by the main frame and standing at an angle one to the other, one of the frames being provided with an opening, a slide mounted in the said frame and extending across the opening thereof, a longitudinally slotted mirror carried by the slide, chart carrying spools mounted in the slide at one side of the mirror and a mirror in the other frame and having a peep hole.

ROY P. ANSTOCK.